United States Patent
Edwards

(10) Patent No.: US 6,801,606 B1
(45) Date of Patent: Oct. 5, 2004

(54) FRAUD MONITORING SYSTEM

(75) Inventor: Alexander F M Edwards, Ipswich (GB)

(73) Assignee: Azure Solutions Limited, Ipswich (GB)

( * ) Notice: Subject to any disclaimer, the term of this patent is extended or adjusted under 35 U.S.C. 154(b) by 0 days.

(21) Appl. No.: 09/463,299

(22) PCT Filed: Jul. 15, 1998

(86) PCT No.: PCT/GB98/02078

§ 371 (c)(1),
(2), (4) Date: Jan. 24, 2000

(87) PCT Pub. No.: WO99/05844

PCT Pub. Date: Feb. 4, 1999

(51) Int. Cl.[7] .................. H04M 15/00; H04M 3/00; H04M 1/66
(52) U.S. Cl. .................. 379/114.14; 379/188; 379/189; 379/127.02; 379/196; 455/410
(58) Field of Search .................. 379/114.01, 114.14, 379/114.17, 127.02, 188, 189, 194, 195, 196, 197, 199, 200; 455/410

(56) References Cited

U.S. PATENT DOCUMENTS 5,345,595 A * 9/1994 Johnson et al. ............ 455/33.1
5,504,810 A * 4/1996 McNair ...................... 379/189
5,627,886 A * 5/1997 Bowman .................... 379/111
5,790,645 A * 8/1998 Fawcett et al. ............. 379/189
5,907,602 A * 5/1999 Peel et al. ............. 379/114.14
6,041,108 A * 3/2000 Brewster et al. ........... 379/196
6,212,266 B1 * 4/2001 Busuioc ...................... 379/189
6,327,345 B1 * 12/2001 Jordan ..................... 379/88.02
6,466,778 B1 * 10/2002 Edwards ..................... 455/410

FOREIGN PATENT DOCUMENTS

| EP | 618713 | 10/1994 |
| EP | 653868 | 5/1995 |
| EP | 661863 | 7/1995 |
| WO | 96 31043 | 10/1996 |

* cited by examiner

Primary Examiner—Quoc Tran
(74) Attorney, Agent, or Firm—Nixon & Vanderhye P.C.

(57) ABSTRACT

In order to detect fraudulent or potentially fraudulent usage of a telecommunications network, each call connected by way of one of the digital main switching units of the network (3a to 3c) has an associated billing record transferred to a fraud management system (4). The fraud management system compares the origin and destination of the call with a known usage pattern for the originator and, if other indications are that the call is of a fraudulent nature, and the call deviates from the known usage pattern an alarm can be forwarded to an operator. The user profile used to determine normal calling behaviour is updated over a period of time in respect of calls determined as not fraudulent. An initial user profile may be generated from historic billing records.

38 Claims, 3 Drawing Sheets

FRAUD MONITORING SYSTEM

BACKGROUND OF THE INVENTION

1. Field of the Invention

The present invention generally relates to a telecommunications network. More particularly, one aspect of the present invention relates to a method and apparatus of automatically detecting fraudulent calls in a telecommunications network and another relates to a method of controlling calls over a telecommunications network.

2. Background of Related Art

Fraudulent use of a telephone communications network can cost the telecommunications operator a significant amount of money. Rule based fraud detection systems have been developed with a view to combating fraud in a telecommunications network. In such systems if a particular usage of the network, determined from a call record, triggers one or more of the predefined rules, an alarm is generated enabling human operators to take the necessary action. While such systems have had some success in combating fraud, difficulties seem to arise due to the sheer number of alarms that can be generated within a short time. Typically, fraud detection operators may have tens of thousands of live alarms to deal with during a day and it is therefore generally impractical to deal with each individual alarm as it arises. Methods have been developed for consolidating or grouping the fraud alarms based on their priority and for identifying patterns in the alarms once generated. Such rule based fraud detection systems however only operate once alarms have been raised.

SUMMARY OF THE INVENTION

In accordance with one aspect the present invention provides method of automatically detecting fraudulent calls in a telecommunications network, the method comprising the steps of:

determining the origination of the calls; and determining whether the call is likely to be a fraudulent call using a predetermined pattern of previous or expected calls specific to the origination.

In accordance with a second aspect the present invention provides apparatus for automatically detecting fraudulent calls in a telecommunications network, the apparatus comprising:

determining means for determining the origination of the call;

storage means for storing data for a pattern of previous or expected calls specific to originations; and fraud detecting means for determining whether the call is likely to be a fraudulent call using the determined origination of the call and the stored pattern of calls specific to the origination.

Thus in accordance with the present invention the pattern of use of the telecommunications network is used which is specific to the origination of the call. Fraudulent activity can be determined by detecting a deviation in the call from the predetermined pattern for the origination of the call. The predetermined pattern comprises information on calls over a period of time and the time of the current call can be used to determine whether the call fits the pattern.

Preferably the origination is determined by receiving a call record containing information on the call. Typically in a telecommunications network when a call is initiated a call record is sent to the exchange which contains information for example identifying the origination, the destination, the time of initiation of the call and the date. By determining the origination of the call from the call record at the initiation of the call, the determination of whether the call is likely to be a fraudulent call can be determined as the call is made. This allows the call to be disallowed or disconnected if the call is determined to a call which lies significantly outside the predetermined pattern of calls.

In order to accommodate changes in the calling behaviour of the originator, the predetermined pattern of calls can be adaptively modified. Such a modification can give a greater weighting to more recently made calls. All the calls which do not deviate significantly from the predetermined pattern of calls can be used to update the pattern. Also, calls which have been determined to be fraudulent can be used to adaptively modify the predetermined pattern of calls once they have been investigated and cleared by, for example, an operator. In this way the pattern of calls can be adapted to more accurately reflect the expected call behaviour of an origination.

The term 'origination' is used in the specification to refer to any identifiable point of origin of a call in a telecommunications network. For example, an origination can comprise an individual user or group user identification code. Examples of such an identification code are a personal number which can be input using a telephone key pad. Such a system is used for instance when using a charge-card. Also for a mobile telephone the SIM card can be used to provide a unique identification code. A code can be assigned to an individual user or a group of users and is independent of the node in the telecommunications network i.e. the telephone number from which the call is made. Alternatively or in addition the identity of a node or group of nodes in the telecommunications network can comprise the origination i.e. a telephone number from a group of telephone numbers, or an area code. Further, the origination can comprise the geographical location from which the call is made. For calls made from mobile telephones, the geographical location can comprise a true geographical location which can, for example, be obtained from the base stations in the cellular network. For a call originating from a conventional telephone handset, the geographical location can be obtained from the telephone number and can be provided as an exact address, or an area such as a town or country.

Thus, one or a combination of these pieces of information identifying the origination of the call can be used to choose a predetermined pattern to be used for the call. For example, for a charge-card user, there may be more than one predetermined pattern termed a user profile assigned to that charge-card depending upon the telecommunications node used to make the call or the geographical location from which the call was made. The user's calling behaviour may be different for different telecommunications nodes and/or different geographical locations. The same is true for mobile telephone users. The pattern of calls in different geographical locations can be quite different and therefore different user profiles can be provided.

In one embodiment the user profile includes information on the call destination for the pattern of calls and thus for the call made the destination is determined in order to determine whether the call fits the normal pattern of calling behaviour for the origination. The call destination information can comprise information identifying a node or group of nodes in the telecommunications network i.e. a specific telephone number, group of numbers, or an area code, and/or a geographical location.

In an embodiment of the present invention the time and/or day or date of the call is determined and the user profile includes information on the time of day of the calls, the day or date of the calls, and/or the frequency of calls made. In this way the information and/or date of the call made can be used to determine whether the call fits the user profile.

Although information on the call such as the origination, the destination, the time, and date of the call can be determined as soon as the call is made from the call record and this information can be used immediately to determine whether the call represents fraudulent activity, if no fraudulent activity is detected, at the termination of the call the duration of the call can be determined and used to carry out a further check since in a preferred embodiment the user profile includes information on the duration of the calls. This specific embodiment provides a further check for fraudulent activity using the full duration parameter.

In accordance with another aspect of the present invention there is provided a method of controlling calls over a telecommunications network, the method comprising the steps of:

determining the origination of a call, and determining whether the call is to be allowed or disallowed using a predetermined pattern of calls specific to the origination.

In accordance with a further aspect of the present invention there is provided apparatus for controlling calls over a telecommunications network, the apparatus comprising:

determining means for determining the origination of a call;

storage means for storing data for a pattern of calls specific to originations;

allowance determining means for determining whether the call is to be allowed or disallowed using the determined origination of the call and the stored pattern of calls specific to the origination; and control means for controlling the call in accordance with the determination.

Thus in accordance with these aspects of the present invention if the call made does not fit the pattern for the origination of the call, the call is automatically disallowed or disconnected.

The call pattern can thus be used to control calls from the origination. It can allow for a level of usage of the telecommunications network which is not fixed but is determined as a pattern. This can also provide automatic protection against fraudulent calls since any calls which do not fit a user profile will not be allowed.

In order to allow a user to force the telecommunications network to allow a call, the user can be allowed to input a code which must be validated by the telecommunications network. If the code is valid the telecommunications network will allow the input of pattern update data to update the pattern of calls for user profile. In this way if a user wishes to significantly change their calling behaviour for example by making a series of long distance telephone calls, the user profile can be manually updated to accept this change in user behaviour.

The predetermined pattern of calls (user profile) is a pattern which is specific to the origination and can be formed during a 'learning' phase during which the calls made from an origination are recorded in order to form the predetermined pattern. Alternatively, the telecommunications network could form the predetermined pattern from the call records for the origination for a previous period of time.

Further, the predetermined pattern could be formed based on the expected pattern of calls for the origination.

BRIEF DESCRIPTION OF THE DRAWINGS; AND DETAILED DESCRIPTION OF EXEMPLARY EMBODIMENTS OF THE INVENTION

Embodiments of the present invention will now be described with reference to the accompanying drawings in which.

Figure 1:
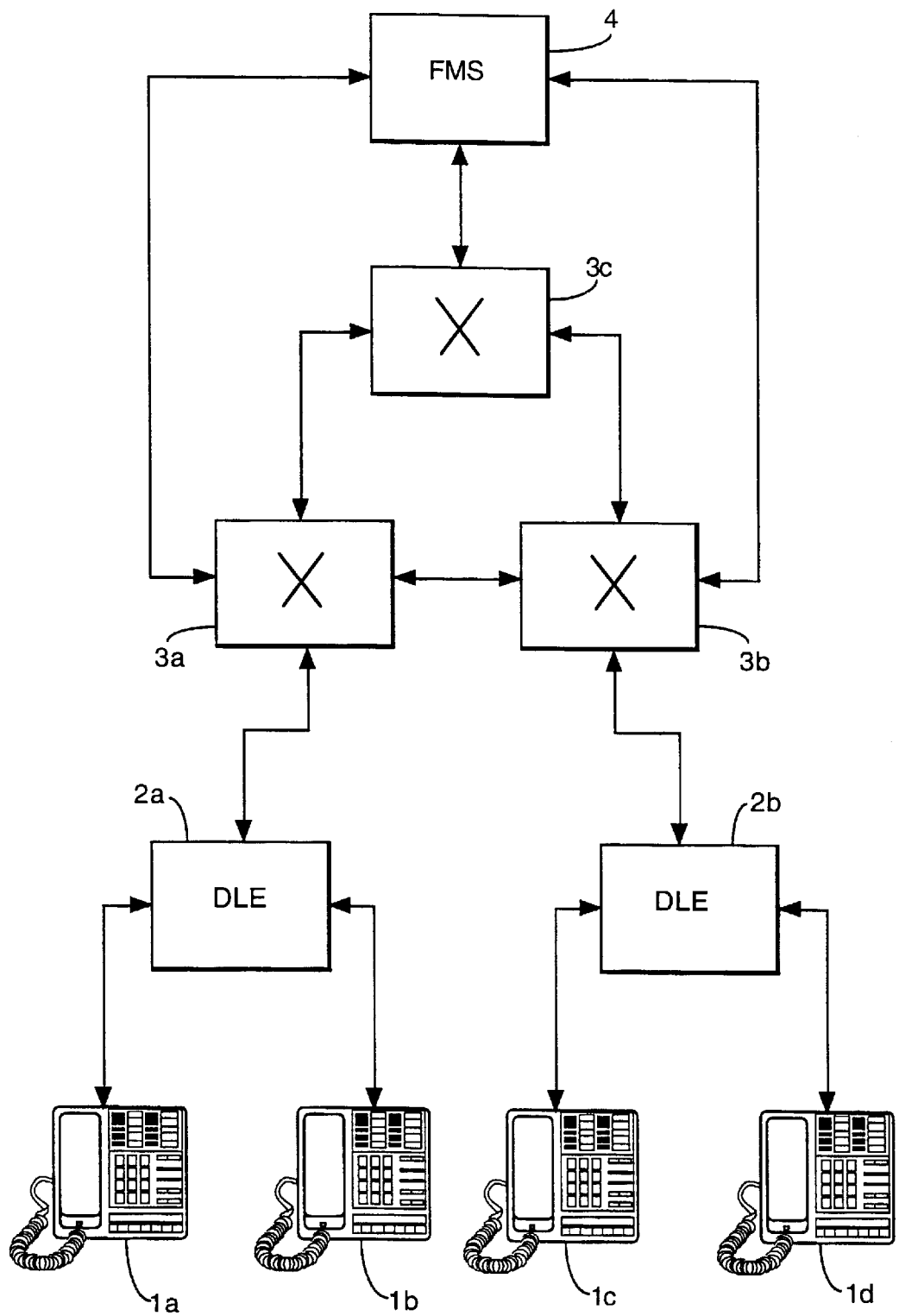
FIG. 1 is a schematic drawing of a telecommunications network including the fraud detection system in accordance with an embodiment of the present invention.

Referring now to FIG. 1 there is illustrated schematically a telephone communications network in which individual telephone handsets 1a, 1b, 1c and 1d are connected to respective digital local exchanges (DLEs) 2a and 2b. The digital local exchanges 2a and 2b receive telephone calls from the telephone handsets 1a, 1b, 1c and 1d and if the telephone call is a local telephone call, the call is routed to the appropriate telephone handset 1a, 1b, 1c and 1d. If however the telephone call is not local, the digital local exchange 2a and 2b routes the call to respective digital main switching units 3a, 3b and 3c. The digital main switching units 3a, 3b and 3c route the calls accordingly between digital local exchanges 2a and 2b.

In this embodiment of the present invention a fraud management system (FMS) 4 monitors the calls being switched by the digital main switching units 3a, 3b and 3c. In order to monitor the calls, the call record for each call is sent to the fraud management system 4 by the appropriate digital main switching unit 3a, 3b and 3c which is handling the call. Since the call record containing information identifying the origination of the call, the destination of the call, and the time and date of the call is available as soon as the call is placed, the fraud management system 4 is able to detect whether the call is a fraudulent call immediately as the call is placed. If it is detected that the call is fraudulent and does not fit the profile of use expected for the point of origin of the call, the fraud management system 4 can instruct the digital main switching units 3a, 3b and 3c to disallow or disconnect the call. Alternatively, an alarm can be raised to bring the call to the attention of an operator to analyze whether action should be taken. Thus, the call can either be automatically barred if the call does not fit the expected profile for the origination, or operator intervention can be instigated.

If a call is allowed to proceed since from the information available at the onset of the call does not indicate that the call represents a significant deviation from the expected calling behaviour for the origination, at the termination of the call the call duration is added to the call record and this further piece of information can be used to carry out a further fraud detection step. If it is determined that this call duration does not fit the expected calling behaviour and the call lies significantly outside the expected call pattern, although it is not possible to bar the call, an alarm can be raised to bring the call to the attention of an operator who can then look into the circumstances surrounding the call.

Figure 2:
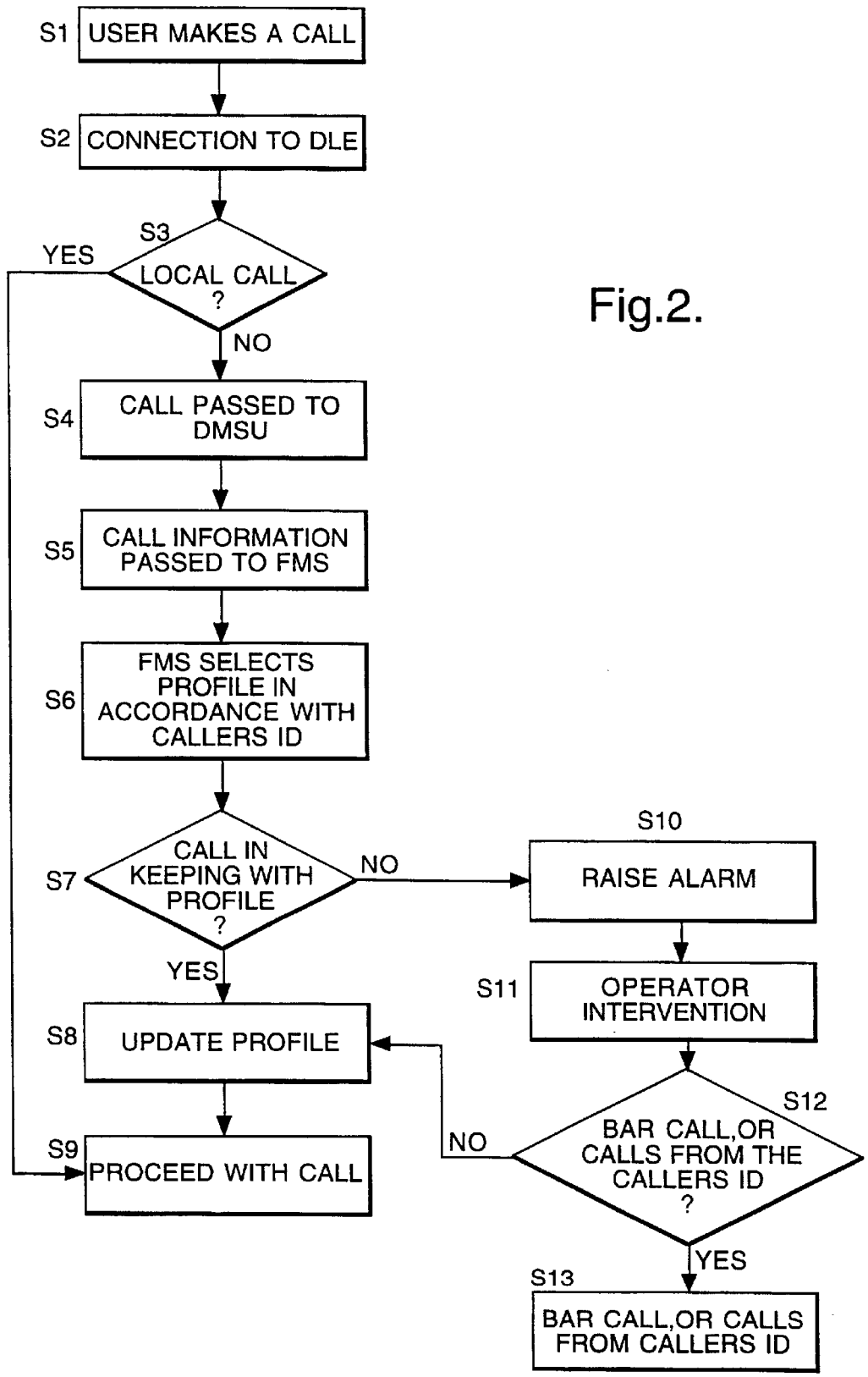
FIG. 2 is a flow diagram illustrating the steps carried out in detecting fraudulent calls using the method of an embodiment of the present invention.

FIG. 2 is a flow diagram illustrating the steps of a call detection method in accordance with an embodiment of the present invention. In step S1 a user makes a call and the call is connected to the digital local exchange in step S2. In step S3 the digital local exchange determines whether the call is local and if so in step S9 the call is proceeded with and the digital local exchange connects the local telephone handsets. If the call is not local the digital local exchange passes the call to a digital main switching unit in step S4. The digital main switching unit then passes on the call information to the fraud management system in step S5. The fraud management system selects a profile in accordance with the caller's ID i.e. the origination of the call in step S6 and in step S7 it is determined whether the call is in keeping with the profile. If a call is in keeping with the profile in step S8 the profile can be updated to take into consideration this call and in step S9 the call is proceeded with i.e. the digital main switching units routes the call. If in step S7 it is determined that the call is not in keeping with the profile, in step S10 an alarm is raised allowing an operator to intervene in step S11. In step S12 the operator can determine whether the call or calls should be barred from the caller's ID. If the call is not to be barred the profile can be updated in step S8 and the call can proceed. Otherwise in step S13 the call or calls from the caller's ID are barred.

Thus in the embodiment of FIG. 2 an alarm is raised allowing an operator to intervene to determined whether to bar the call or not. However, in an alternative embodiment if the call is not in keeping with the profile, the call can be automatically barred.

Figure 3:
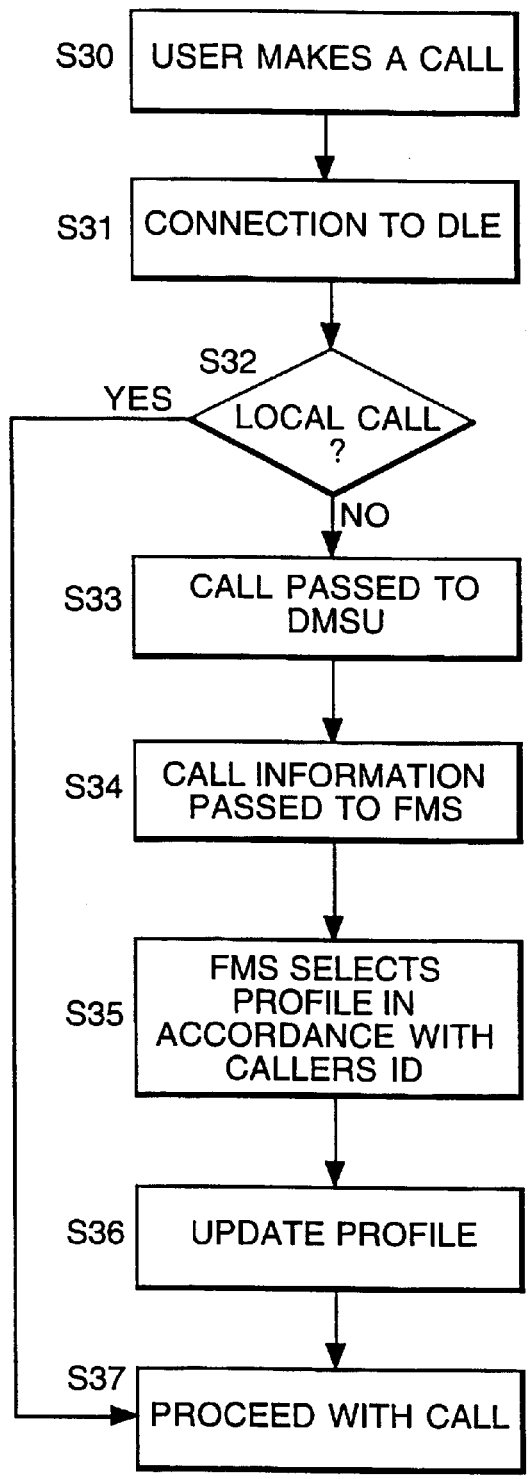
FIG. 3 is a flow diagram illustrating the steps of a preferred method of forming the user profile.

FIG. 3 is a flow diagram illustrating one method of forming a user profile.

This method represents a method of learning a user's profile during a learning phase.

In step S30 a user makes a call and in step S31 the call is connected to the local exchange. In step S32 it is determined whether the call is local and if the call is local the process proceeds to step S37 where the call proceeds. If the call is not local the call is passed by the digital local exchange to the digital main switching unit in step S33. The digital main switching unit then passes the call information to the fraud management system in step S34 and in step S35 the fraud management system selects the profile in accordance with the caller's ID. The selected profile can then be updated in step S36 using the information about the call and in step S37 the call can proceed.

In an alternative method of forming the user profile, instead of carrying this out on line as illustrated in FIG. 3, a telecommunications operator can utilize stored call records for a period of time in order to form a user profile 'off line'.

Alternatively, unexpected user profiles can be generated based on the expected calling behaviour of the user. This technique may be used for instance where there is a new user with no historical call information.

It can be seen from FIG. 2 that the profile can be constantly updated in order to track changes in calling behaviour for a user or origination.

The user profile represents a pattern of calling behaviour for a point of origin of a call in a telecommunications network. The point of origin can be specific to a personal number such as a charge-card or mobile telephone SIM, a node or group of nodes of the telecommunications network i.e. a telephone number or group of telephone numbers, or a geographical location i.e. a specific location which for a mobile telephone can, for example, be provided by the cellular base stations and for a conventional fixed telephone handset can be provided by a database identifying the telephone number and location, or a generalised locations such as a building, area, city, or country. A combination of this origination information can be used to provide more than one profile for a user. For example, if a charge-card user uses telephones in two different regions of the country regularly, two different profiles can be provided for the charge-card depending upon the geographical location from which the call was made. Similarly, for mobile telephone users more than one user profile can be provided.

In embodiments of the present invention the user profile contains information not just on the point of origin of the calls but also the destinations. The destinations can be identified as nodes or groups of nodes in the telecommunications network i.e. telephone numbers, groups of telephone numbers, or area codes, and/or geographical locations i.e. specific locations or areas. Thus, the user profile can identify calls made from an origination to a destination over a period of time. The profile can also include summary information such as the frequency of calls to be made by the origination during a period of time. Also subsets of this information can be provided e.g the frequency of calls made to a specific telephone number, area code or geographical location during a period of time. As calls are made during a period of time the pattern of calls being made during the current time period can be compared with the pattern of calls made during a previous time period to detect fraudulent activities e.g. if frequency of calls increases significantly outside the behaviour range there is potential fraud. The calling patterns of each origination can extend over any period of time e.g. a number of hours, a day, a week, a month, or any desired period.

For a mobile user e.g. using a charge-card or a mobile telephone, when a call is made from a new location i.e. a new node in the telecommunications network or a new geographical location, a new user profile can be generated for that location adaptively.

User profiles can be stored for preceding periods of time e.g. an hour, a day, or a week. A user profile which is an average for previous periods of time can be stored and the averaging can be carried out by performing a weighted average to give favour to the most recently recorded profiles. In order to update the user profile the current profile recorded during the most recent period of time is averaged in their weighted manner with the average user profile automatically. This average user profile is the user profile which is used for fraud detection. If a fraudulent call was detected during the recording of the current or most recent profile, this profile can be ignored in the updating of the average user profile at the end of the period. If this 'fraudulent' call recurs, this call could be allowed to be included in the profile once an investigation has been undertaken to ensure that the call is not fraudulent.

If a call is outside a usual pattern of calling, an embodiment of the present invention provides for a user to enter a validation code to force the acceptance of the call and to update the current user profile.

Although in the foregoing embodiments an origination comprising a personal identification number has been described only with reference to charge-cards and mobile telephone SIMs, the present invention is applicable to a system wherein users are provided with codes which must be entered to allow a user to make a telephone call. The code is a unique identifer to identify the user which causes the selection of the appropriate user profile to provide calls allowed for by the user profile. Thus in this embodiment calls over the communications network from a user can be controlled in accordance with the user's profile which can be preset in advance to restrict the user's access to telephone numbers over the network. Similarly, the access to telephone numbers over the network at any point of origination e.g. charge-card, mobile telephone, or telephone number can be controlled by a predetermined user's profile. In this way the telephone numbers available at periods of time i.e. the pattern of calls for a user can be controlled. Thus the user profile represents a pattern of allowed calls specific to the origination rather than a pattern of previous or expected calls as described hereinabove with reference to the previous embodiments. Embodiments of the present invention can thus provide for the control of calls over a telecommunications network not just the detection of potentially fraudulent calls.

What is claimed is:

1. A method of automatically detecting fraudulent calls in a telecommunications network, the method comprising the steps of:
   providing a plurality of user profiles associated with a user, each of the plurality of user profiles comprising a predetermined pattern of previous or expected calls, each of said plurality of user profiles being specific to a call origination of a call to be made by the user;
   determining the origination of the call made by the user;
   selecting one of said plurality of profiles dependent on the determined origination; and
   determining whether the call is likely to be a fraudulent call based on the selected user profile.

2. A method according to claim 1 including the step of receiving a call record containing information on the call, wherein the step of determining the origination of the call uses the call record.

3. A method according to claim 1 wherein the call is determined to be a fraudulent call if it lies significantly outside the predetermined pattern of calls within the selected user profile.

4. A method according to claim 1 including the step of adaptively modifying the predetermined pattern of calls within the selected user profile to update the pattern to accommodate changes in calling behaviour of the origination.

5. A method according to claim 4 wherein the adaptive modification of the predetermined pattern of calls is a weighted averaging operation which is weighted to favour the most recent calls.

6. A method according to claim 4 wherein calls determined to be fraudulent are used for adaptively modifying the predetermined pattern of calls once they have been investigated and cleared.

7. A method according to claim 1 wherein the origination is determined as at least one of the set comprising a node or group of nodes in the telecommunications network, and a geographical location.

8. A method according to claim 1 including the step of determining the destination of the call, wherein the selected user profile includes information on the call destination.

9. A method according to claim 8 wherein the call destination information in said selected user profile comprises information identifying a node or group of nodes in the telecommunications network and/or a geographical location.

10. A method according to claim 1 including the step of determining the time and/or day or date of the call, wherein the predetermined pattern of calls within the selected user profile includes information on at least one of the set of the time of day of the calls, the day or date of the calls, and the frequency of calls made.

11. A method according to claim 1 including the step of determining the duration of the call, wherein said selected user profile includes information on the duration of calls.

12. A method according to claim 2 wherein the call record is received and used in the determination as the call is made.

13. A method according to claim 1 including the steps of receiving an input code from the origination, validating the input code, and receiving pattern update data from the origination and updating said selected user profile if the input code is valid.

14. A method according to claim 1 wherein a pattern of calls from the origination for a current time period is compared with a pattern of calls for a previous time period in order to determine whether there is likely to be fraudulent activity.

15. A method according to claim 7, wherein the telecommunications network is a cellular network which includes a plurality of base stations, the method further comprising determining the geographical location from the location of the base station through which the call is made.

16. A method according to claim 7, wherein the telecommunications network is a fixed network in which calls are made from a plurality of fixed telephones at predetermined locations, each of said telephones being associated with a predetermined number, the method further comprising determining the geographical location from the predetermined telephone number of the telephone from which the call is made.

17. A method according to claim 1, further comprising the step of determining whether the call is to be allowed or disallowed based on the determination of whether the call is likely to be a fraudulent call.

18. A method according to claim 17, comprising disallowing the call if the call is determined to be a fraudulent call.

19. Apparatus for automatically detecting fraudulent calls in a telecommunications network, the apparatus comprising:
   determining means for determining the origination of the call made by the user;
   storage means for storing data for a plurality of user profiles associated with the user, each of the plurality of profiles comprising a pattern of previous or expected calls, each of said plurality of profiles being specific to a call origination;
   means for selecting one of said plurality of user profiles dependent on the determined origination; and
   fraud detecting means for determining whether the call is likely to be a fraudulent call based on the selected user profile.

20. Apparatus according to claim 19 wherein said determining means includes means for receiving a call record containing information on the call, and the fraud detecting means is adapted to use the call record information in the determination.

21. Apparatus according to claim 19 wherein said fraud detecting means is operative to determine that a call is fraudulent if it lies significantly outside the predetermined pattern of calls within the selected user profile.

22. Apparatus according to claim 19 including adaptive means for adaptively modifying the predetermined pattern of calls within the selected user profile to update the pattern to accommodate changes in calling behaviour of the origination.

23. Apparatus according to claim 22 wherein said adaptive means is operative to carry out a weighted averaging operation wherein the most recent calls are given the highest weighting in the adaption process.

24. Apparatus according to claim 22 wherein said adaptive means is operative to use calls determined to be fraudulent in the adaptive process once the calls have been investigated and cleared.

25. Apparatus according to claim 19 wherein said determining means is operative to determine the origination as at least one of the set comprising a node or group of nodes in the telecommunications network and a geographical location.

26. Apparatus according to claim 19 including means for determining the destination of the call, wherein said storage means is adapted to store information on the call destination within the selected user profile.

27. Apparatus according to claim 26 wherein said storage means is adapted to store the information on the call destination which comprises information identifying a node or group of nodes in the telecommunications network and/or a geographical location.

28. Apparatus according to claim 19 including means for determining the time and/or day or date of the call, wherein said storage means is adapted to store information on at least one of the set of the time of day of the calls, the day or date of the calls, and the frequency of the calls within the selected user profile.

29. Apparatus according to claim 19 including means for determining the duration of the call, wherein said storage means is adapted to store information on the duration of calls within the selected user profile.

30. Apparatus according to claim 20 wherein said means for receiving the call record is operative to receive the call record as the call is made and said fraud detecting means is operative to determine whether the call is likely to be a fraudulent call as the call is made.

31. Apparatus according to claim 19 including means for receiving an input code from the origination, means for validating the input code, and means for receiving pattern update data from the origination and for updating said selected user profile if the input code is valid.

32. Apparatus according to claim 19 including current storage means for storing a pattern of calls from the origination for a current time period, wherein said storage means stores a pattern of calls for a previous time period, and said fraud detection means is adapted to compare the pattern for the current time period with the pattern for the previous time period in order to determine whether there is likely to be fraudulent activity.

33. Apparatus according to claim 25, wherein the telecommunications network is a cellular network which includes a plurality of base stations and wherein the determining means is operative to determine the geographical location from the location of the base station through which the call is made.

34. Apparatus according to claim 25, wherein the telecommunications network is a fixed network in which calls are made from a plurality of fixed telephones at predetermined locations, each of said telephones being associated with a predetermined number, the determining means being operative to determine the geographical location from the predetermined telephone number of the telephone from which the call is made.

35. An apparatus according to claim 19, wherein the fraud detecting means determines whether the call is to be allowed or disallowed based on the determination of whether the call is likely to be a fraudulent call.

36. A method of automatically detecting a fraudulent call in a telecommunications network, the method comprising:
providing a plurality of user profiles, each associated with a different geographical location from which a user may make a call, each profile being used to determine whether a call made by the user from a given geographical location is fraudulent;
determining the geographical location from which the user makes a call;
selecting from the plurality of user profiles, the profile that corresponds to the determined location; and
determining whether the call is likely to be a fraudulent call based on the selected profile.

37. An apparatus for automatically detecting fraudulent calls in a telecommunications network, the apparatus comprising:
determining means for determining a geographical location from which a user makes a call;
storage means for storing data for a plurality of user profiles, each associated with a different geographical location from which the user may make a call, each profile being used to determine whether a call made by the user from a given geographical location is fraudulent;
means for selecting, from the plurality of user profiles, the profile that corresponds to the determined location; and
fraud detecting means for determining whether the call is likely to be a fraudulent call based on the selected user profile.

38. An apparatus according to claim 37, wherein the fraud detecting means determines whether the call is to be allowed or disallowed based on the determination of whether the call is likely to be a fraudulent call.

* * * * *